United States Patent
Wei et al.

(10) Patent No.: US 12,007,221 B2
(45) Date of Patent: Jun. 11, 2024

(54) HETEROGENEOUS INTEGRATION DETECTING METHOD AND HETEROGENEOUS INTEGRATION DETECTING APPARATUS

(71) Applicant: Industrial Technology Research Institute, Hsinchu (TW)

(72) Inventors: Hsiang-Chun Wei, Hsinchu (TW); Chih-Hsiang Liu, Hsinchu County (TW); Yi-Sha Ku, Hsinchu (TW); Chung-Lun Kuo, New Taipei (TW); Chun-Wei Lo, Taichung (TW); Chieh-Yi Lo, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 17/562,019

(22) Filed: Dec. 27, 2021

(65) Prior Publication Data

US 2023/0152086 A1 May 18, 2023

(30) Foreign Application Priority Data

Nov. 18, 2021 (TW) .................................. 110143061

(51) Int. Cl.
*G01B 11/22* (2006.01)
*G01B 9/02* (2022.01)
*G01B 9/02015* (2022.01)

(52) U.S. Cl.
CPC ............ *G01B 11/22* (2013.01); *G01B 9/0203* (2013.01); *G01B 9/02049* (2013.01)

(58) Field of Classification Search
CPC .............. G01B 9/0203; G01B 9/02049; G01B 11/0675; G01B 11/22; G01B 11/26;
(Continued)

(56) References Cited

U.S. PATENT DOCUMENTS 5,917,599 A * 6/1999 Nishikawa ............. G01B 11/27
356/510
6,898,537 B1 5/2005 McGahan
(Continued)

FOREIGN PATENT DOCUMENTS

CN 102082108 6/2011
CN 102460672 5/2012
(Continued)

OTHER PUBLICATIONS

"Office Action of Taiwan Counterpart Application", dated Sep. 2, 2022, p. 1-p. 3.
(Continued)

*Primary Examiner* — Hwa Andrew Lee
(74) *Attorney, Agent, or Firm* — JCIPRNET

(57) ABSTRACT

A heterogeneous integration detecting method and a heterogeneous integration detecting apparatus are provided. The heterogeneous integration detecting method includes the following. Under the condition of maintaining the same relative distance between an interference objective lens and a sample, the relative posture of the interference objective lens and the sample is continuously adjusted according to the change of an image of the sample in the field of view of the interference objective lens until a first optical axis of the interference objective lens is determined to be substantially perpendicular to the surface of the sample according to the image. The interference objective lens is replaced with an imaging objective lens and the geometric profile of at least one via of the sample is detected. A second optical axis of the imaging objective lens after replacement overlaps with the first optical axis of the interference objective lens before replacement.

10 Claims, 9 Drawing Sheets

(58) Field of Classification Search
CPC .... G01B 11/27; G01B 11/272; G01B 21/047; G01B 21/18; G01B 21/24
See application file for complete search history.

(56) References Cited

U.S. PATENT DOCUMENTS

| | | | |
|---|---|---|---|
| 7,236,251 B2* | 6/2007 | Takaoka | G02B 21/0072 356/497 |
| 8,531,679 B2 | 9/2013 | Scheiner | |
| 2007/0165241 A1* | 7/2007 | Laguart Bertran | G01B 9/04 356/497 |
| 2007/0253057 A1 | 11/2007 | Potsaid et al. | |
| 2009/0066953 A1 | 3/2009 | Horie | |
| 2010/0321671 A1 | 12/2010 | Marx et al. | |
| 2012/0026478 A1 | 2/2012 | Chen et al. | |
| 2012/0248595 A1 | 10/2012 | Or-Bach et al. | |
| 2018/0285493 A1 | 10/2018 | Huang et al. | |
| 2019/0038127 A1* | 2/2019 | Ito | A61B 3/12 |
| 2021/0088576 A1 | 3/2021 | Lin et al. | |
| 2021/0102860 A1 | 4/2021 | Delbeke et al. | |
| 2021/0148698 A1 | 5/2021 | Chen et al. | |

FOREIGN PATENT DOCUMENTS

| | | |
|---|---|---|
| CN | 103165492 | 6/2013 |
| TW | I408363 | 9/2013 |
| TW | I441271 | 6/2014 |
| TW | 201617582 | 5/2016 |
| TW | I600876 | 10/2017 |
| TW | 201826422 | 7/2018 |

OTHER PUBLICATIONS

Yi-Sha Ku, "Spectral reflectometry for metrology of three-dimensional through-silicon vias," J. of Micro/ Nanolithography, MEMS, and MOEMS, vol. 13, No. 1, Mar. 2014, pp. 1-11.

* cited by examiner

HETEROGENEOUS INTEGRATION DETECTING METHOD AND HETEROGENEOUS INTEGRATION DETECTING APPARATUS

CROSS-REFERENCE TO RELATED APPLICATION

This application claims the priority benefit of Taiwan application serial no. 110143061, filed on Nov. 18, 2021. The entirety of the above-mentioned patent application is hereby incorporated by reference herein and made a part of this specification.

BACKGROUND

Technical Field

The disclosure relates to a detecting method and a detecting apparatus, and in particular to a heterogeneous integration detecting method and a heterogeneous integration detecting apparatus.

Description of Related Art

In a packaging technology of a 3 dimension integrated circuit (3D IC), a through-silicon via (TSV) technology enables electrical signals to be transmitted in a shorter vertical path, thereby shortening the length of the conductive path to greatly reduce an RC delay problem.

When an optical non-destructive method is used to detect the depth of a through-silicon via, if the incident light is not perpendicular to a surface of a sample, the depth of the through-silicon via cannot be detected correctly. As an aperture of the through-silicon via is becoming increasingly smaller, its aspect ratio increases. The incident light not being perpendicular to the surface of the sample causes the accuracy of the optical non-destructive detection to decrease substantially.

SUMMARY

The disclosure provides a heterogeneous integration detecting method and a heterogeneous integration detecting apparatus, which prevent a substantial decrease in the accuracy of optical non-destructive detection.

A heterogeneous integration detecting method of the disclosure includes the following. Under a condition of maintaining a same relative distance between a sample and an interference objective lens, a relative posture of the interference objective lens and the sample is continuously adjusted according to a change of an image of the sample in a field of view of the interference objective lens, until a first optical axis of the interference objective lens is determined to be substantially perpendicular to a surface of the sample according to the image. The interference objective lens is replaced with an imaging objective lens, and a geometric profile of at least one via of the sample is detected; a second optical axis of the imaging objective lens after replacement overlaps with the first optical axis of the interference objective lens before replacement.

The heterogeneous integration detecting apparatus of the disclosure includes a first moving mechanism, an optical system, a sample carrier, and an analyzer. The optical system is installed on the first moving mechanism. The optical system includes an interference objective lens and an imaging objective lens. The sample carrier is used to carry a sample. The analyzer is used to obtain an image output by the optical system. Under a condition of maintaining a same relative distance between the sample and the interference objective lens, a relative posture of the interference objective lens and the sample is continuously adjusted by using the first moving mechanism according to a change of the image of the sample in a field of view of the interference objective lens, until a first optical axis of the interference objective lens is determined to be substantially perpendicular to a surface of the sample according to the image. The interference objective lens is replaced with the imaging objective lens, and a geometric profile of at least one via of the sample is detected; a second optical axis of the imaging objective lens after replacement overlaps with the first optical axis of the interference objective lens before replacement.

Based on the above, in the heterogeneous integration detecting method and the heterogeneous integration detecting apparatus of the disclosure, the optical axis of the imaging objective lens is substantially perpendicular to the surface of the sample, thereby improving the accuracy of detection.

DESCRIPTION OF THE EMBODIMENTS

First of all, heterogeneous integration refers to assembling and packaging a plurality of separately manufactured elements into a single package to improve functions and operating characteristics.

Figure 1:
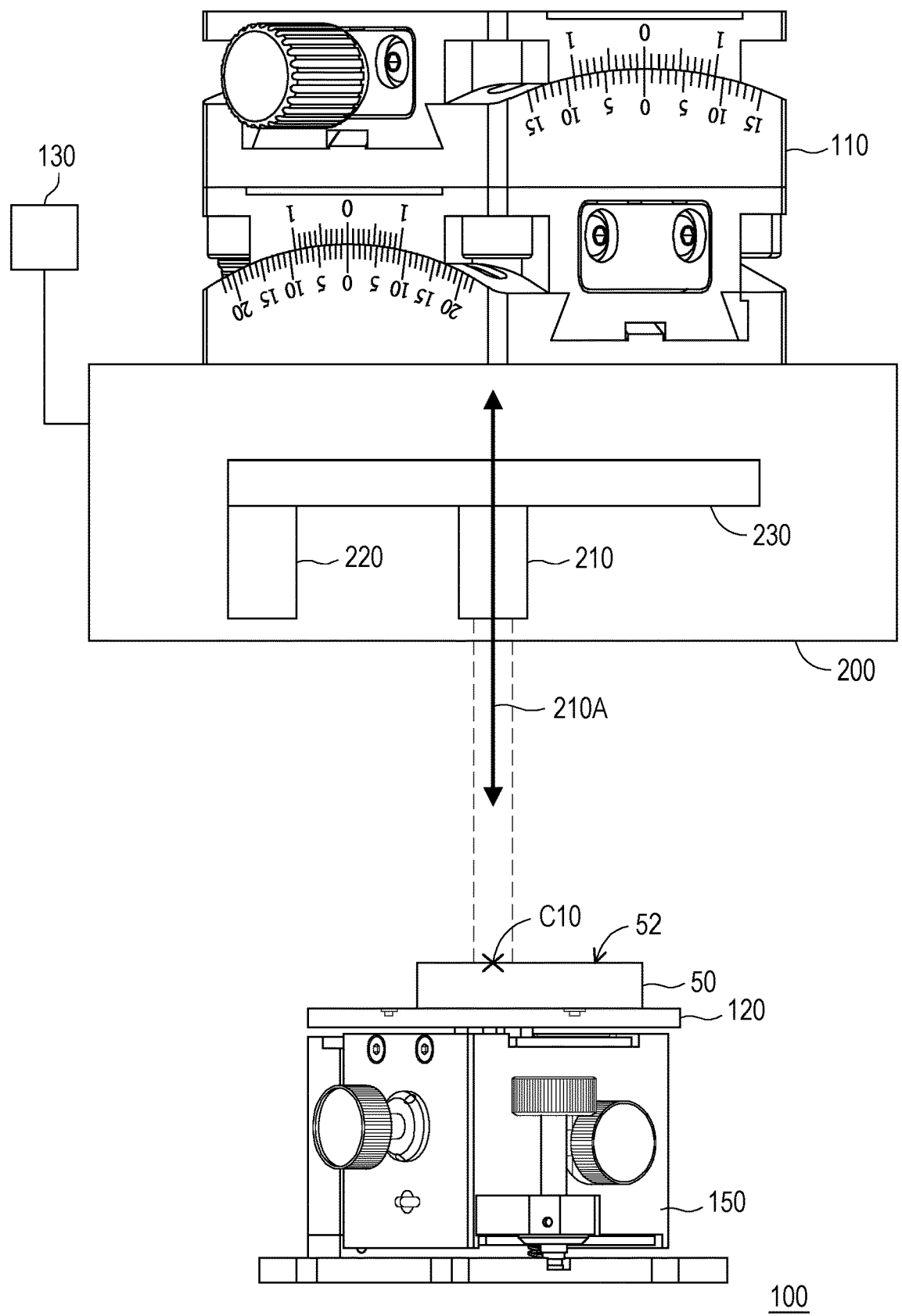
FIG. 1 is a schematic view of a heterogeneous integration detecting apparatus according to an embodiment of the disclosure.

FIG. 1 is a schematic view of a heterogeneous integration detecting apparatus according to an embodiment of the disclosure. Referring to FIG. 1, a heterogeneous integration detecting apparatus 100 of this embodiment includes a first moving mechanism 110, an optical system 200, a sample carrier 120, and an analyzer 130. The optical system 200 is installed on the first moving mechanism 110. The optical system 200 includes an interference objective lens 210 and an imaging objective lens 220. The sample carrier 120 is used to carry a sample 50. The analyzer 130 is used to obtain an image output by the optical system 200. In this embodiment, the optical system 200 is entirely installed on the first moving mechanism 110, but the disclosure is not limited thereto.

Figure 2:
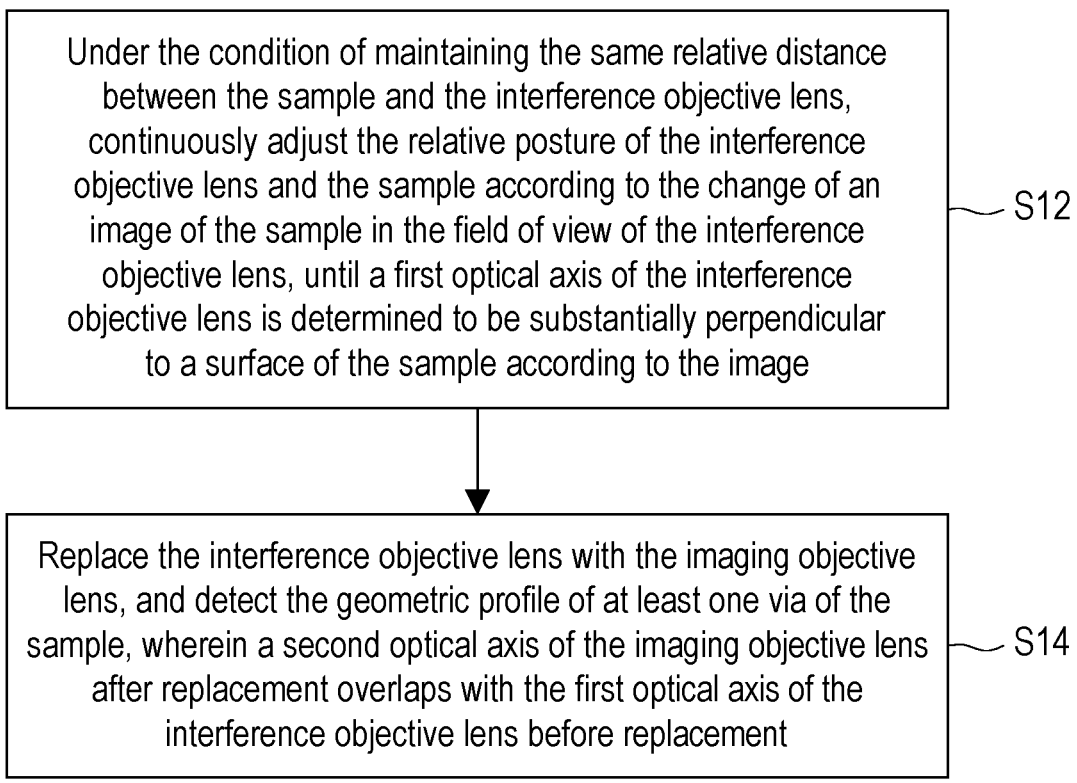
FIG. 2 is a flow chart of a heterogeneous integration detecting method according to an embodiment of the disclosure.

FIG. 2 is a flow chart of a heterogeneous integration detecting method according to an embodiment of the disclosure. Referring to FIG. 1 and FIG. 2, first, under the condition of maintaining the same relative distance between the interference objective lens 210 and the sample 50, the relative posture of the interference objective lens 210 and the sample 50 is continuously adjusted by the first moving mechanism 110 according to the change of an image of the sample 50 in the field of view of the interference objective lens 210, until a first optical axis 210A of the interference objective lens 210 is determined to be substantially perpendicular to a surface 52 of the sample 50 according to the image, which is step S12. The same relative distance mentioned here means that the distance between the interference objective lens 210 and a center point C10 of the field of view on the sample 50 is substantially the same.

In addition, optionally, in addition to maintaining the same relative distance between the interference objective lens 210 and the sample 50, the field of view of the interference objective lens 210 may also be maintained to be the same; that is, the range on the sample 50 that may be seen through the interference objective lens 210 is substantially the same. Of course, with the change of the relative posture of the interference objective lens 210 and the sample 50, the edge of the field of view slightly changes. However, as long as the position of the center point C10 of the field of view remains the same, the field of view may be regarded as the same.

With the adjustment of the relative posture of the interference objective lens 210 and the sample 50, the image of the sample 50 in the field of view of the interference objective lens 210 also changes. From the changing trend of the image, it may be determined how to adjust the relative posture of the interference objective lens 210 and the sample 50 so that the first optical axis 210A of the interference objective lens 210 changes toward the trend of the surface 52 that is substantially perpendicular to the sample 50. Finally, it may be determined from the image that the first optical axis 210A of the interference objective lens 210 is substantially perpendicular to the surface 52 of the sample 50, and the adjustment of the relative posture of the interference objective lens 210 and the sample 50 may be stopped at this time. In this embodiment, the determination of the change of the image and the adjustment of the relative posture of the interference objective lens 210 and the sample 50 may be completed through automatic control by a computer running a software.

Figure 3:
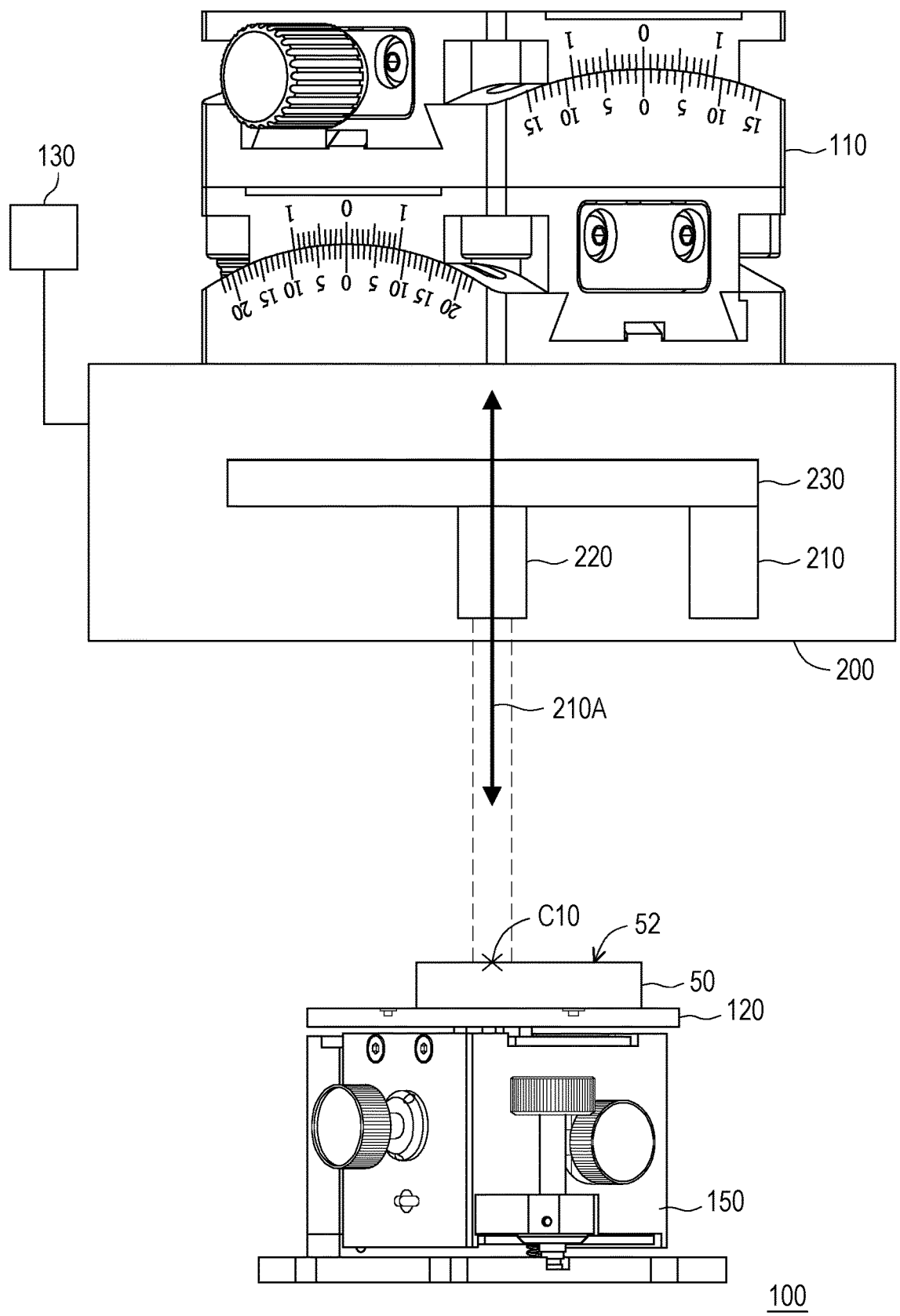
FIG. 3 is a schematic view of the heterogeneous integration detecting apparatus of FIG. 1 in another state.

FIG. 3 is a schematic view of the heterogeneous integration detecting apparatus 100 of FIG. 1 in another state. Referring to FIG. 2 and FIG. 3, the interference objective lens 210 is replaced with the imaging objective lens 220, and the geometric profile of at least one via 54 (marked in FIG. 4) of the sample 50 is detected, which is step S14. A second optical axis 220A of the imaging objective lens 220 after replacement overlaps with the first optical axis 210A of the interference objective lens 210 before replacement. Since the second optical axis 220A of the imaging objective lens 220 after replacement overlaps with the first optical axis 210A of the interference objective lens 210 before replacement, the second optical axis 220A of the imaging objective lens 220 after replacement is also substantially perpendicular to the surface 52 of the sample 50. In this way, it may be ensured that light for detection which passes through the imaging objective lens 220 to be irradiated on the sample 50 is perpendicular to the surface 52 of the sample 50, so that the depth of the via 54 may be correctly detected.

According to the above, in the heterogeneous integration detecting apparatus 100 and the heterogeneous integration detecting method of this embodiment, first, the interference objective lens 210 is used to confirm that the light for detection may be irradiated on the sample 50 in the direction perpendicular to the of the surface 52 of the sample 50. Next, the interference objective lens 210 is replaced with the imaging objective lens 220 and the geometric profile of at least one via 54 of the sample 50 is detected. Therefore, the sample 50 may be detected non-destructively with high accuracy.

Figure 4:
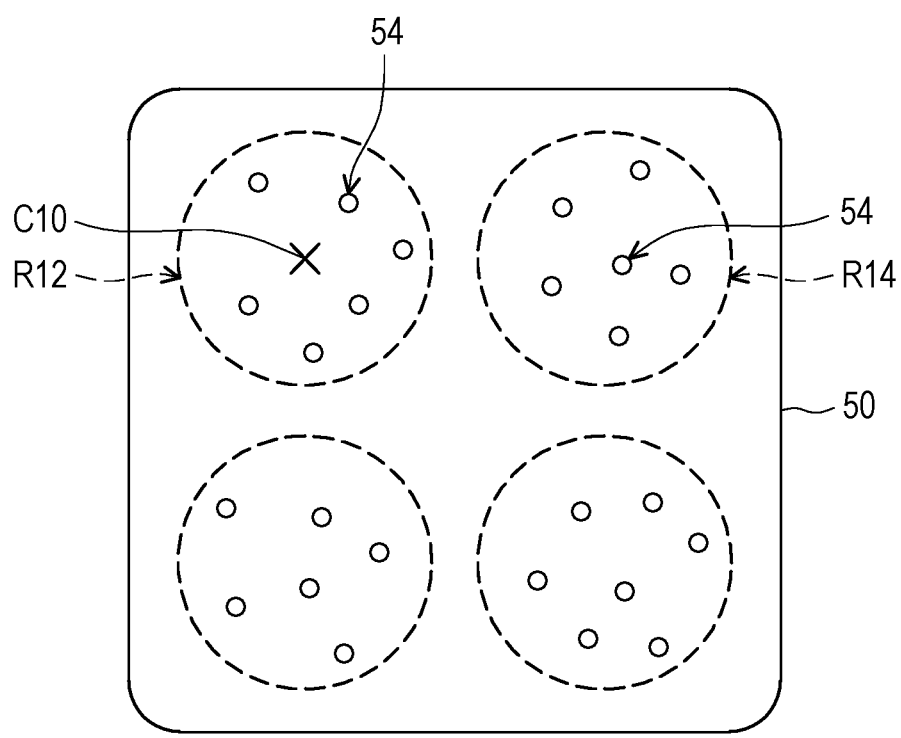
FIG. 4 is a schematic top view of a sample detected by the heterogeneous integration detecting apparatus of FIG. 1.

FIG. 4 is a schematic top view of the sample 50 detected by the heterogeneous integration detecting apparatus 100 of FIG. 1. Referring to FIG. 1 and FIG. 4, in this embodiment, the heterogeneous integration detecting method further includes the following. After the geometric profile of at least one via 54 of the sample 50 is detected, the imaging objective lens 220 is replaced with the interference objective lens 210, and the sample 50 is moved to change the field of view of the interference objective lens 210. Next, the previous step is repeated to detect the geometric profile of the via 54 in other regions of the sample 50. The area of the sample 50 is usually not completely covered by a single field of view of the interference objective lens 210. For example, in the previous step, the field of view of the interference objective lens 210 and the field of view of the imaging objective lens 220 after replacement correspond to a first detection region R12 on the sample 50. After the detection of the geometric profile of the via 54 of the first detection region R12 on the sample 50 is completed, the geometric profile of a via of a region outside the first detection region R12 on the sample 50, for example, the geometric profile of a via of a region R14, may be detected to complete the detection of all the regions that need to be detected on the sample 50 in order. In addition to replacing the imaging objective lens 220 with the interference objective lens 210, it is also necessary to move the sample 50 so that the field of view of the interference objective lens 210 corresponds to the region R14 on the sample 50. Next, since the posture of the sample 50 may be changed in the moving process thereof, or a surface of the region R14 on the sample 50 is not completely parallel to a surface of the first detection region R12 on the sample 50, or other factors, step S12 in FIG. 2 is repeated to reconfirm that the first optical axis 210A of the interference objective lens 210 is substantially perpendicular to the surface 52 of the sample 50. After that, step S14 in FIG. 2 is proceeded to to detect the geometric profile of the via 54 of the region R14 on the sample 50.

In this embodiment, the optical system 200 further includes a second moving mechanism 230 for moving the interference objective lens 210 and the imaging objective lens 220 along the direction perpendicular to the first optical axis 210A of the interference objective lens 210. In this way, the possibility of the direction of the first optical axis 210A of the imaging objective lens 220 after replacement not overlapping with the first optical axis 210A of the interference objective lens 210 before replacement may be reduced.

In this embodiment, the first moving mechanism 110 is a goniometer stage, moving the interference objective lens 210 on a spherical surface whose center of the sphere is the center point C10 of the field of view of the interference objective lens 210 on the sample 50. In other words, in the process of the first moving mechanism 110 moving the optical system 200, the distance between the interference objective lens 210 and the center point C10 of the sample 50 in the field of view of the interference objective lens 210 remains the same.

In this embodiment, the heterogeneous integration detecting apparatus 100 further includes a tri-axial movement mechanism 150. The sample carrier 120 is installed on the tri-axial movement mechanism 150. In the process of adjusting the relative posture of the interference objective lens 210 and the sample 50, if it is found that the distance between the interference objective lens 210 and the center point C10 of the sample 50 in the field of view of the interference objective lens 210 has changed, the tri-axial movement mechanism 150 may allow the sample carrier 120 to translate along three axes to compensate for the position deviation of the sample 50.

Figure 5:
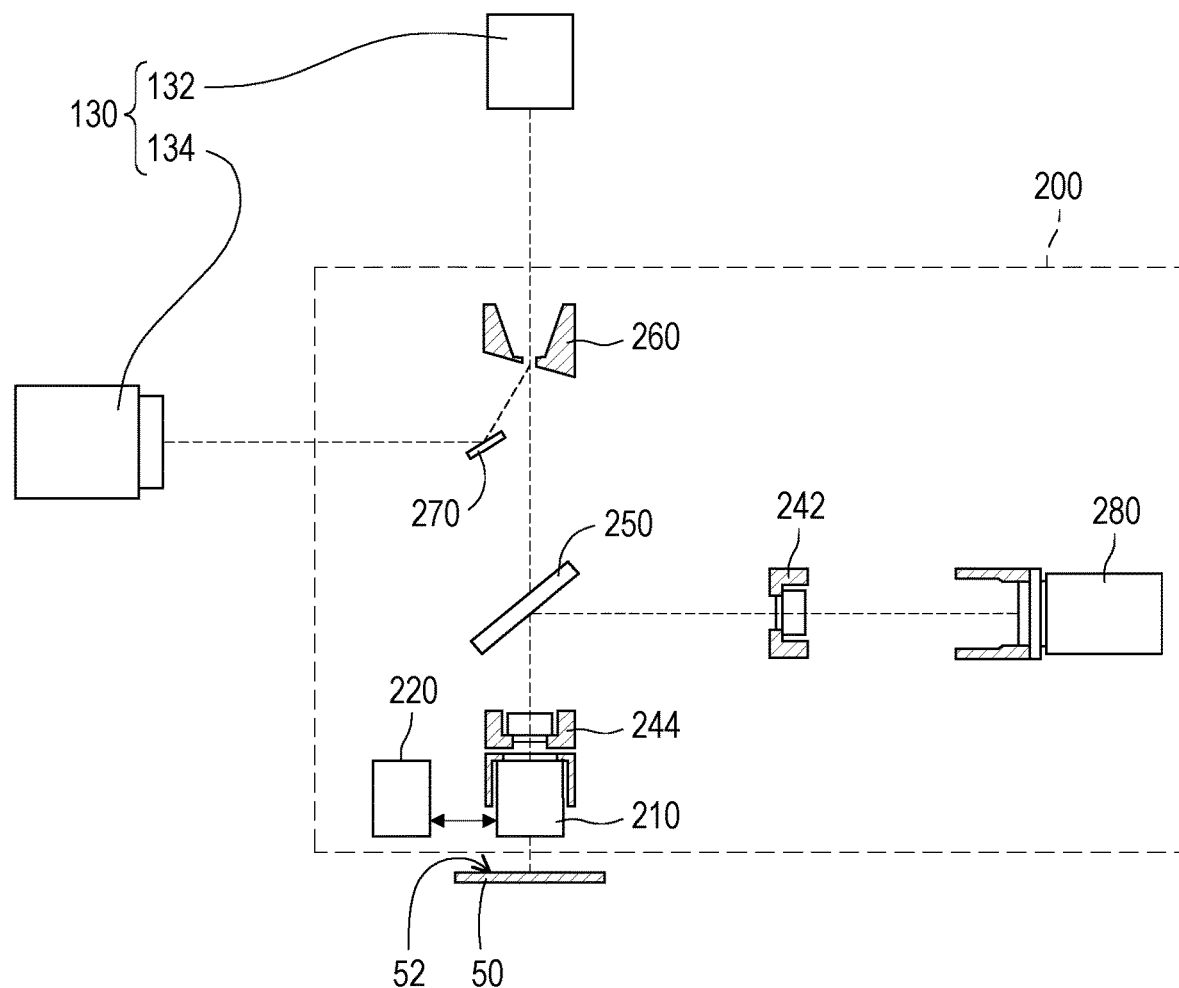
FIG. 5 is a schematic view of an optical path of the heterogeneous integration detecting apparatus of FIG. 1.

FIG. 5 is a schematic view of an optical path of the heterogeneous integration detecting apparatus 100 of FIG. 1. Referring to FIG. 1 and FIG. 5, in this embodiment, the analyzer 130 includes a spectrometer 132 for detecting the geometric profile of at least one via 54 of the sample 50. An example will be given later to illustrate how the spectrometer 132 detects the geometric profile of at least one via 54 of the sample 50. In this embodiment, the analyzer 130 further includes an image-capturing element 134. The image-capturing element 134 obtains an image output by the optical system 200. Through analyzing this image, it may be determined whether the first optical axis 210A of the interference objective lens 210 is substantially perpendicular to the surface 52 of the sample 50. For example, in the process of adjusting the relative posture of the interference objective lens 210 and the sample 50, the change of the image includes the change in density of interference stripes, the change in the direction of interference stripes, or other changes. Based on such changes, it may be determined how to adjust the relative posture of the interference objective lens 210 and the sample 50 so that the first optical axis 210A of the interference objective lens 210 changes toward the trend of being substantially perpendicular to the surface 52 of the sample 50.

In this embodiment, the optical system 200 may further include a light source 280, apertures 242 and 244, a beam splitter 250, an aperture mirror 260, and a mirror 270. Of course, as long as the functional requirements of the optical system 200 in the foregoing description may be met, the optical system 200 may further include other elements or omit some elements. Light provided by the light source 280 first passes through the aperture 242, and through the adjustment of the aperture 242, the range of light irradiated on the surface of the sample 50 may be changed. After the light passes through the aperture 242, all or part of the light is reflected by the beam splitter 250 and passes through the aperture 244. The beam splitter 250 may be a semi-transmissive and semi-reflective beam splitter 250 or other types of beam splitter. After passing through the aperture 244, the light is irradiated on a surface of the sample 50 and is reflected to pass through the aperture 244 again to reach the beam splitter 250. When the sample 50 reflects light, there may be some stray light, which affects the determination of the geometric profile of the via 54. Therefore, by appropriately reducing the aperture 244, stray light may be filtered out, thereby improving the accuracy of the determination of the geometric profile of the via 54.

All or part of the light passing through the aperture 244 and reaching the beam splitter 250 passes through the beam splitter 250 to reach the aperture mirror 260. The light passing through the aperture at the center of the aperture mirror 260 may reach the spectrometer 132, and the spectrum measured by the spectrometer 132 may be used to determine the geometric profile of the via 54. On the other hand, light that does not pass through the aperture at the center of the aperture mirror 260 is reflected to the mirror 270, and then reflected to the image-capturing element 134 by the mirror 270. The image-capturing element 134 may be used to display the change in density of interference stripes, the change in the direction of interference stripes, or other changes to determine how to adjust the relative posture of the interference objective lens 210 and the sample 50.

Figure 6:
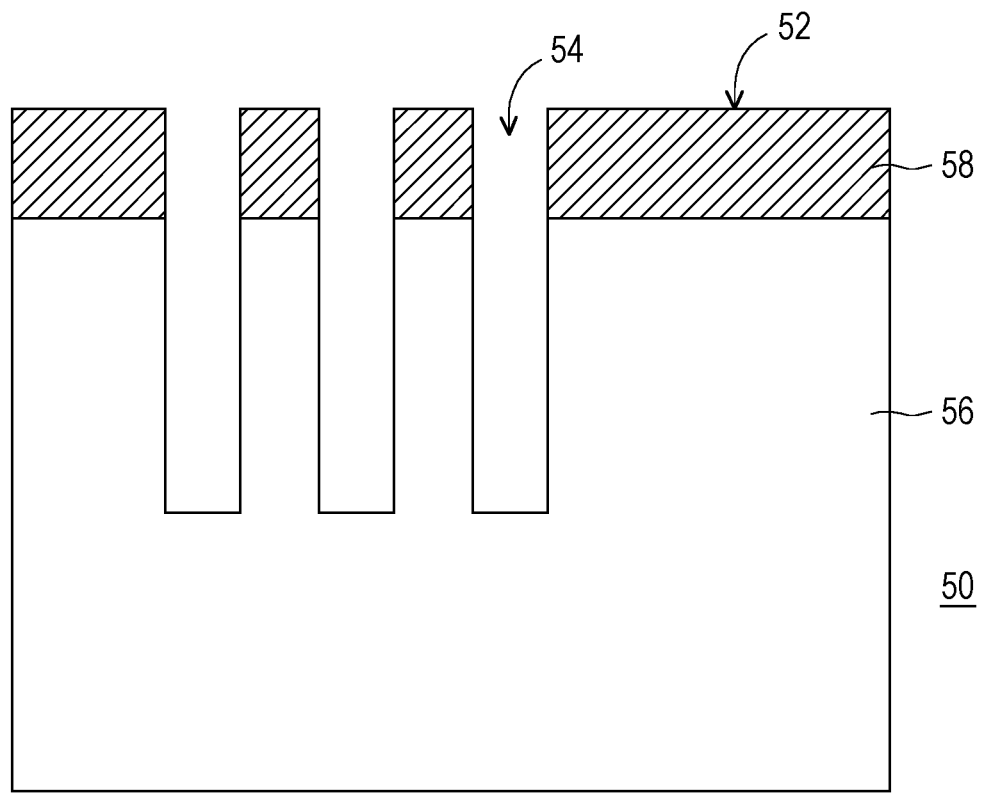
FIG. 6 is a schematic cross-sectional view of a portion of the sample of FIG. 1.

FIG. 6 is a schematic cross-sectional view of a portion of the sample of FIG. 1. Referring to FIG. 1 and FIG. 6, the sample 50 of this embodiment includes a substrate 56 and a film layer 58 covering the substrate 56, and the via 54 passes through the film layer 58 and extends to the substrate 56. The substrate 56 is, for example, a silicon substrate, and the material of the substrate 56 and the material of the film layer 58 are different, but the disclosure is not limited thereto. In this embodiment, detecting the geometric profile of at least one via 54 of the sample 50 includes detecting the depth of at least one via 54 of the sample 50. For example, since a plurality of vias 54 are included in the field of view of the imaging objective lens 220, the average depth of these vias 54 may be measured. In addition, in order to improve accuracy, a plurality of measurements may be performed to obtain an average value of a plurality of measurement data items.

Figure 7:
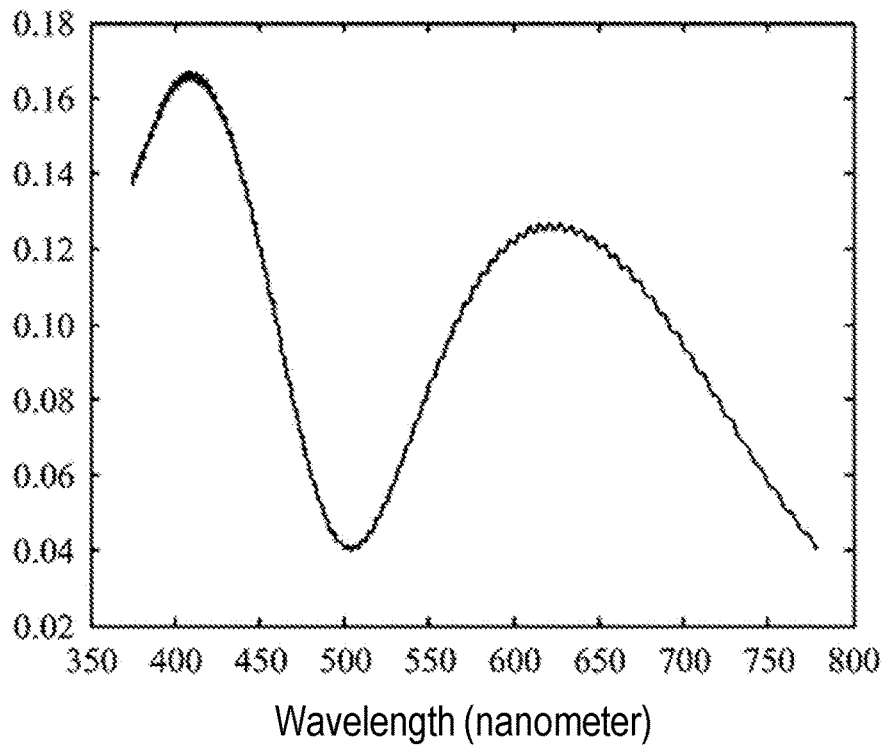
FIG. 7 is a schematic diagram of a spectrum signal obtained by the heterogeneous integration detecting apparatus of FIG. 1.

FIG. 7 is a schematic diagram of a spectrum signal obtained by the heterogeneous integration detecting apparatus 100 of FIG. 1. FIG. 7 shows a spectrum of light reaching the spectrometer 132. The lateral axis is the wavelength in nanometers (nm). The vertical axis is the intensity of the light incident on the spectrometer being normalized according to the intensity of the light provided by the light source. It may be seen from FIG. 7 that the light reaching the spectrometer 132 is mainly a low-frequency curve waveform, and the low-frequency curve waveform is loaded with a high-frequency curve waveform. After the waveform of FIG. 7 is analyzed, a low-frequency spectrum as shown in FIG. 8 and a high-frequency spectrum as shown in FIG. 9 may be obtained.

Figure 8:
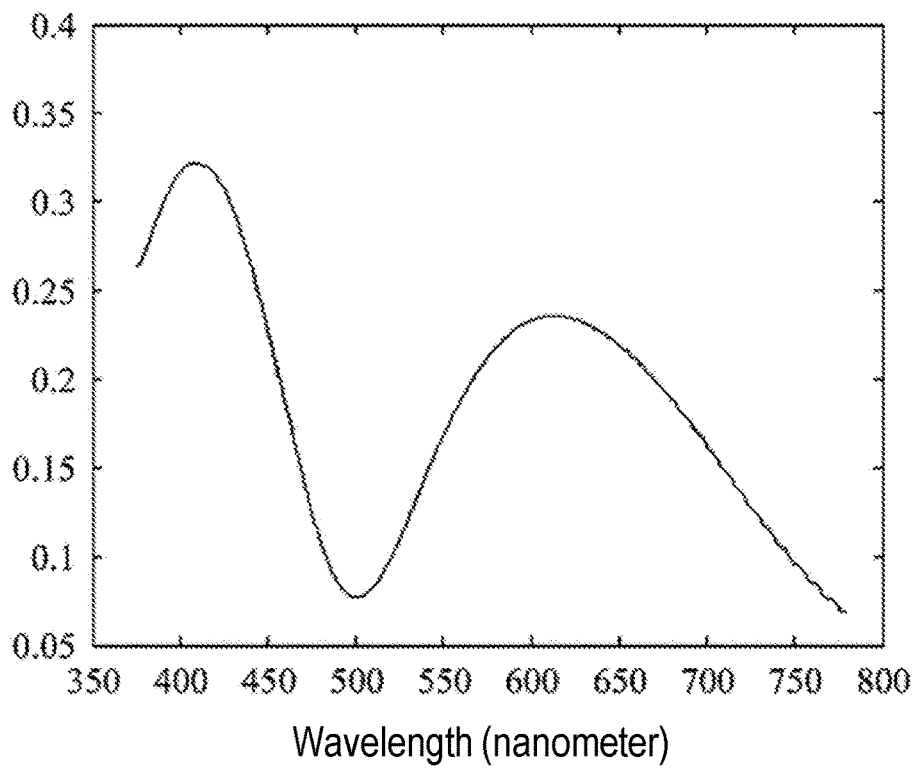
FIG. 8 is a low-frequency spectrum analyzed from the spectrum signal of FIG. 7.
Figure 9:
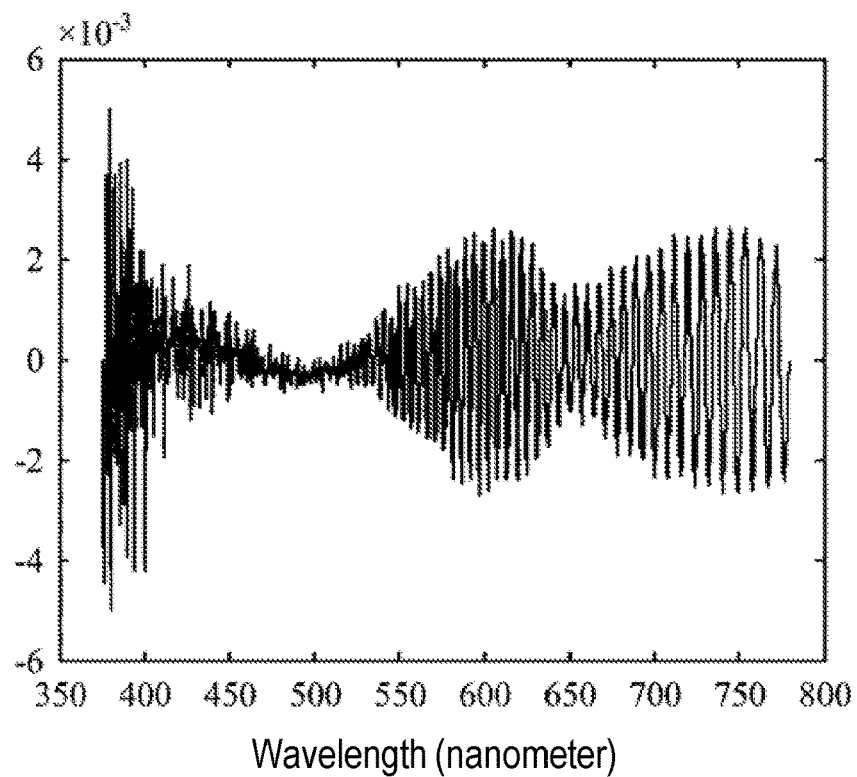
FIG. 9 is a high-frequency spectrum analyzed from the spectrum signal of FIG. 7.
Figure 10:
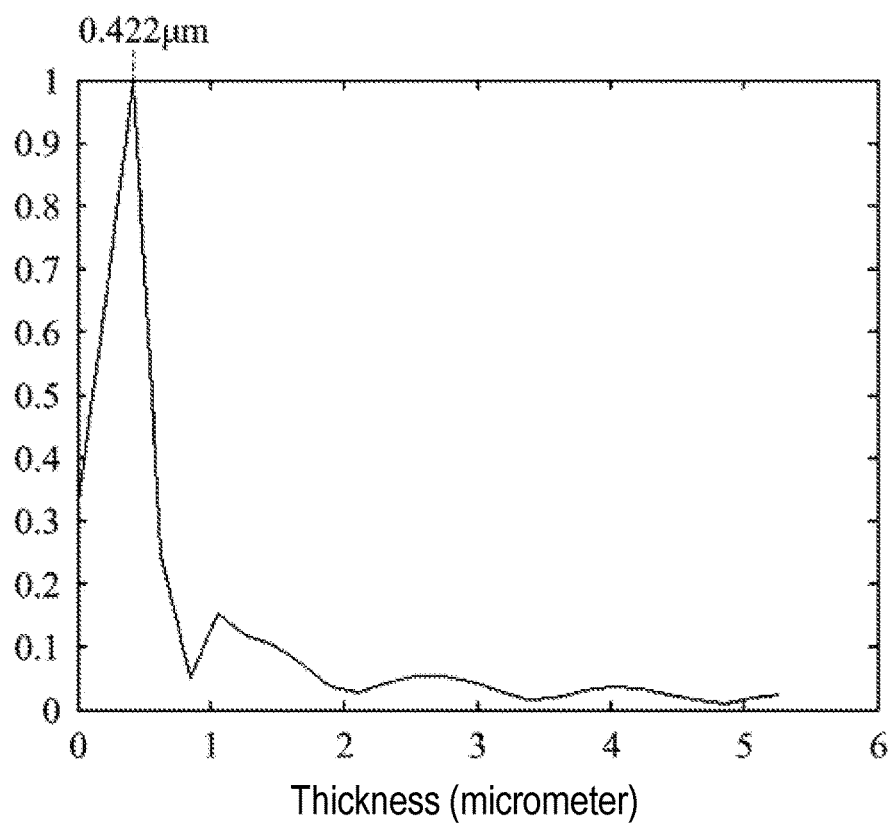
FIG. 10 is a result of signal processing on the low frequency spectrum of FIG. 8.
Figure 11:
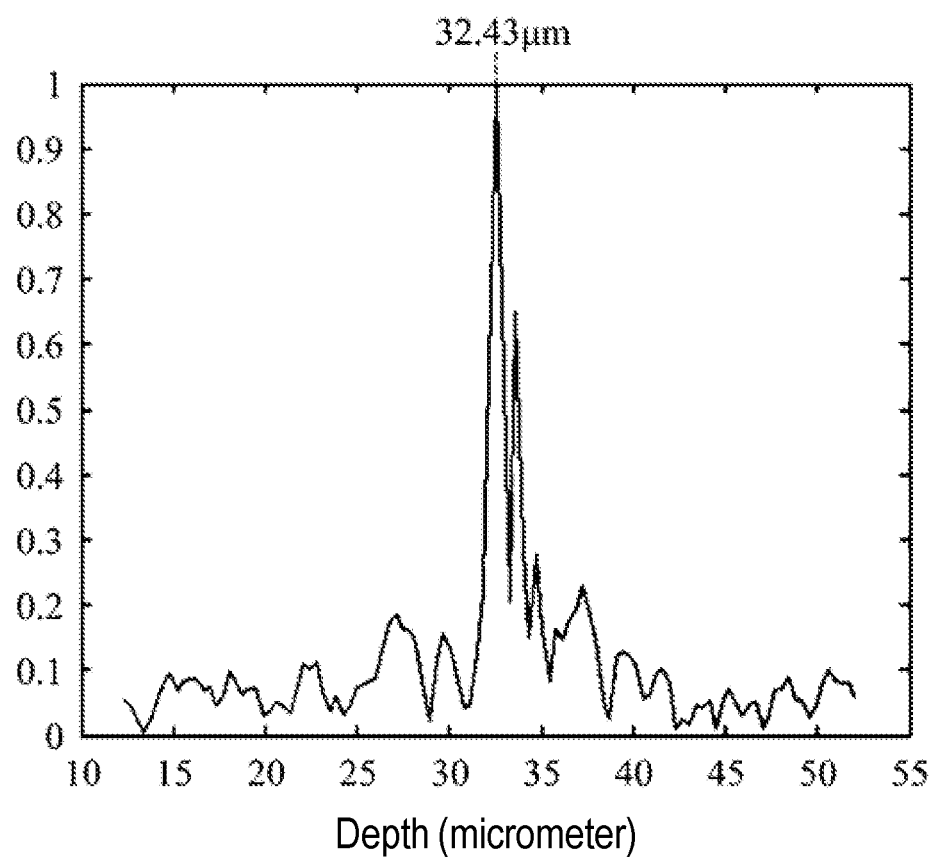
FIG. 11 is a result of signal processing on the high frequency spectrum of FIG. 9.

The low-frequency spectrum and the high-frequency spectrum as shown in FIG. 8 and FIG. 9 are in a wavelength domain. The low-frequency spectrum and the high-frequency spectrum may be converted to an inverse wavelength domain first, and then the low-frequency spectrum and high-frequency spectrum after conversion may be subjected to fast fourier transform (FFT) to form the waveforms as shown in FIG. 10 and FIG. 11. In FIG. 10 and FIG. 11, the lateral axis is the length in micrometers (μm), and the vertical axis is the intensity of the light incident on the spectrometer being standardized according to the intensity of the light provided by the light source. In FIG. 10, the position with the maximum intensity has a value of 0.422 micrometers on the lateral axis, from which it may be determined that the thickness of the film layer 58 is 0.422 micrometers. In FIG. 11, the position with the maximum intensity has a value of 32.43 micrometers on the lateral axis, from which it may be determined that the depth of the via 54 is 32.43 micrometers. The above examples illustrate how the geometric profile of the via 54 is determined in the embodiment, but the disclosure is not limited thereto.

In summary, in the heterogeneous integration detecting method and the heterogeneous integration detecting apparatus in the disclosure, the interference objective lens is first used to confirm that the optical axis is substantially perpendicular to the surface of the sample, and then the imaging objective lens is used to perform detection, which may improve the accuracy of the detection.

What is claimed is:

1. A heterogeneous integration detecting method, comprising:
under a condition of maintaining a same relative distance between a sample and an interference objective lens, continuously adjusting a relative posture of the interference objective lens and the sample according to a change of an image of the sample in a field of view of the interference objective lens, until a first optical axis of the interference objective lens is determined to be substantially perpendicular to a surface of the sample according to the image; and
switching the interference objective lens to an imaging objective lens, and detecting a geometric profile of at least one via of the sample, wherein a second optical axis of the imaging objective lens after replacement overlaps with the first optical axis of the interference objective lens before replacement.

2. The heterogeneous integration detecting method according to claim 1, wherein detecting the geometric profile of the at least one via of the sample comprises detecting a depth of the at least one via of the sample.

3. The heterogeneous integration detecting method according to claim 1, wherein the process of switching the interference objective lens to the imaging objective lens is to move the interference objective lens and the imaging objective lens along a direction perpendicular to the first optical axis of the interference objective lens.

4. The heterogeneous integration detecting method according to claim 1, wherein adjusting the relative posture of the interference objective lens and the sample comprises: moving the interference objective lens on a spherical surface whose center of the sphere is a center point of the field of view of the interference objective lens on the sample.

5. The heterogeneous integration detecting method according to claim 4, wherein adjusting the relative posture of the interference objective lens and the sample further comprises: allowing the sample to translate along three axes.

6. The heterogeneous integration detecting method according to claim 1, further comprising: after detecting the geometric profile of the at least one via of a first detection region of the sample, switching the imaging objective lens to the interference objective lens and moving the sample to change the field of view of the interference objective lens, and then repeating the previous step to detect a geometric profile of a via of a region of the sample located outside the first detection region.

7. The heterogeneous integration detecting method according to claim 1, wherein the change of the image is at least one of a change in density of interference stripes and a change in a direction of the interference stripes.

8. A heterogeneous integration detecting apparatus, comprising:
a first moving mechanism, comprising a first block and a second block, wherein the first block slidably assembled to the second block;
an optical system, installed on the first block of the first moving mechanism, wherein the optical system comprises an interference objective lens and an imaging objective lens;
a sample carrier, configured to carry a sample;
a second moving mechanism comprising a movable table, wherein the interference objective lens and the imaging objective lens are disposed on the movable table; and
an analyzer, coupled with the optical system to obtain an image output from the optical system, the analyzer comprising a spectrometer configured to detect the spectrum after the interference objective lens switched to the imaging objective lens, and an image-capturing element comprising a camera and a display coupled with the optical system to display a change of the image of the sample in a field of view of the interference objective lens;
wherein, a first optical axis of the interference objective lens is substantially perpendicular to a surface of the sample by a sliding between the first block and the second block while a relative distance between the sample and the interference objective lens is kept constant,
wherein the first moving mechanism is a goniometer stage, and the interference objective lens is moved on a spherical surface whose center of the sphere is a center point of the field of view of the interference objective lens on the sample.

9. The heterogeneous integration detecting apparatus according to claim 8, wherein the optical system further comprises a second moving mechanism, used to move the interference objective lens and the imaging objective lens along a direction perpendicular to the first optical axis of the interference objective lens.

10. The heterogeneous integration detecting apparatus according to claim 8, further comprising a tri-axial movement mechanism, wherein the sample carrier is installed on the tri-axial movement mechanism.

* * * * *